United States Patent Office 3,305,550
Patented Feb. 21, 1967

3,305,550
CHLOROMETHYLAMIDINIUM SALTS
Karl-Heinz Koenig and Horst Pommer, Ludwigshafen (Rhine), Germany, assignors to Badische Anilin- & Soda-Fabrik Aktiengesellschaft, Ludwigshafen (Rhine), Germany
No Drawing. Filed Oct. 8, 1963, Ser. No. 314,623
Claims priority, application Germany, Oct. 9, 1962, B 69,143
5 Claims. (Cl. 260—247.5)

This invention relates to new chloromethylamidinium salts and to a process for their production.

It is an object of this invention to provide a process for the production of chloromethylamidinium salts, which class of compounds has not been described heretofore. It is a further object of the invention to provide a process by which new and very valuable substances are obtained. Another object of the invention is the provision of new substances, which may be used as valuable disinfectants. A further object of this invention is to provide a process by means of which the desired substances may be obtained in high yields.

We have now found that these objects are achieved in accordance with this invention and chloromethylamidinium salts having the general formula:

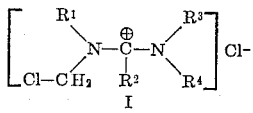

are obtained in which $R^1$ denotes an alkyl having 1 to 4 carbon atoms, a chloroalkyl radical with 1 to 4 carbon atoms or a phenyl radical which may bear a chlorine atom or a nitro group as a substitutent, $R^2$ denotes a hydrogen atom, an alkyl radical having one to four carbon atoms or an aryl with 6 to 10 carbon atoms, $R^3$ denotes a hydrogen atom, an alkyl radical having one to four carbon atoms or an aryl with 6 to 10 carbon atoms, $R^4$ denotes a hydrogen atom, an alkyl radical having one to four carbon atoms or an aryl with 6 to 10 carbon atoms, $R^2$ and $R^3$, or $R^2$ and $R^4$ together with the nitrogen atom to which $R^3$ and $R^4$ are attached may form a saturated ring having five to seven ring members. $R^3$ and $R^4$ together with the nitrogen atom to which $R^3$ and $R^4$ are attached may form a ring having five to six members, which ring may contain in addition one oxygen atom, by reacting a chloromethylcarbamic acid chlorde havng the general formula:

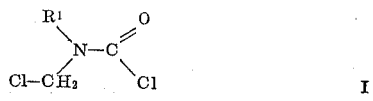

in which $R^1$ has the above-mentioned meaning with a carboxylic acid amide having the general formula:

in which $R^2$, $R^3$ and $R^4$ have the above-mentioned meanings, at temperatures between 0° and 120° C.

The preferred temperature range for carrying out the process according to this invention is between 20° and 80° C.

For example, the reaction of N-methyl-N-chloromethyl-carbamic acid chloride with dimethylformamide may be represented as follows:

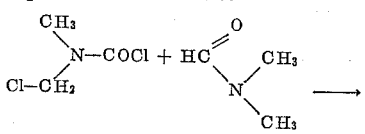

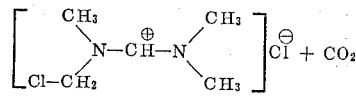

It is to be understood that the reaction products I may also be represented in two other mesomeric forms in which the nitrogens carry the positive charge:

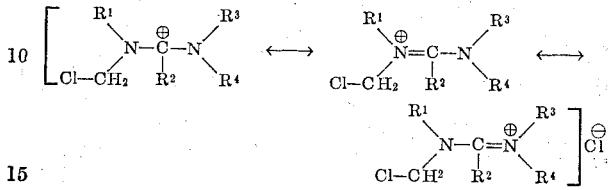

Examples of carbamic acid chlorides having the general Formula I are:

N-methyl-N-chloromethylcarbamic acid chloride,
N-butyl-N-chloromethylcarbamic acid chloride,
N,N-bis-(chloromethyl)-carbamic acid chloride,
N-chloropropyl-N-chloromethylcarbamic acid chloride,
N-phenyl-N-chloromethylcarbamic acid chloride,
N-chloromethyl-N-(p-chlorophenyl)-carbamic acid chloride or
N-chloromethyl-N-(m-nitrophenyl)-carbamic acid chloride.

These initial materials may be prepared for example by chlorinating the corresponding carbamic acid chlorides as described in the copending application Serial No. 208,629, filed July 9, 1962, by Karl-Heinz Koenig and Horst Pommer.

Examples of the carboxylic amides having the general Formula II are:

formamide,
N-methylformamide,
N,N-dimethylformamide,
N,N-dibutylformamide,
N,N-diethylformamide,
formanilide,
pyrrolidone,
N-methylpyrrolidone,
morpholylformamide,
piperidylformamide,
pyrroylidylformamide,
N,N-dimethylacetamide,
N,N-dipropylbutyramide,
N-butylbenzamide,
N,N-dimethyl-p-toluylic acid amide and
N-p-tolyl naphthoic acid amide.

The rate of reaction and the yield are dependent on the reactivity of the two reactants I and II. As a rule, the most reactive carbamic acid chlorides are those which bear two chlorine atoms in α- and α'-position to the nitrogen atom and the amides which react most readily are those which contain at least one hydrogen atom on the amide group. For example N,N-bis-(chloromethyl)-carbamic acid chloride reacts with dimethylformamide even at room temperature with strong evolution of carbon dioxide and the formation of N,N-bis-(chloromethyl)-N',N'-dimethylformamidinium chloride. The most favorable reaction temperature may readily be ascertained by a small-scale experiment.

The process is advantageously carried out at atmospheric pressure. To carry out the reaction the initial materials are allowed to act on each other direct or in solvents or diluents. One of the reactants, for example the carbamic acid chloride, may be added slowly during the reaction. In general it is advantageous to work in the presence of an inert solvent. Hydrocarbons, such as n-hexane, benzene, toluene or xylene, or ketones, such as acetone, methyl ethyl ketone, diethyl ketone and methyl isobutyl ketone, are particularly suitable as inert solvents. The ketones are used particularly when reacting carboxylic amides which have no substituents or only one substituent on the nitrogen atom. As a rule, the solvents are used in amounts representing from 5 to 75% by weight of the reaction mixture.

It is advantageous to use the initial materials in equivalent amounts. One or other of the reactants may however be used in excess, for example 0.05 to 0.5 molar excess.

It is surprising that these chloromethylamidinium compounds should be obtainable by this method in such good yields, i.e. up to 95% of the theory, because it is known that the chlorine atom of a chloromethyl group attached to a nitrogen atom is as mobile as the chlorine atom of an acid chloride. It would therefore rather have been expected that to a great extent the chlorine atoms in α-position to the nitrogen atom in reacting with carboxylic amides would react with the oxygen atom of the amide group with the formation of oxonium salts, and would not form amidinium salts with the elimination of carbon dioxide.

Some of the new substances prepared by the process according to this invention crystallize well, but most of the new substances are very hygroscopic. The end products—whether in the form of crystals or oils—can be used for other reactions without further purification. Because of their reactivity in polar media and their insolubility in indifferent media they cannot, in general, be further purified by recrystallization. They are valuable intermediates for the production of pharmaceuticals. A 0.5 to 5.0% aqueous solution of the salts may be used as a disinfectant. Articles to be disinfected may be dipped in the solution or the solution may be sprayed onto the articles. The disinfectant action of salts containing two chloromethyl groups in the molecule is particularly good.

The invention is further illustrated by the following examples. The parts specified in the examples are parts by weight.

EXAMPLE 1

N,N - bis - (chloromethyl)-N′,N′-dimethylformamidinium chloride:

440 parts of bis-(chloromethyl)-carbamic chloride is dripped at room temperature into a mixture of 183 parts of dimethylformamide and 300 parts by volume of benzene. The temperature slowly rises while carbon dioxide is evolved. The temperature is kept at 45° to 55° C. by cooling until evolution of carbon dioxide has stopped. The crystalline product is filtered off with suction, washed with acetone and again filtered off with suction. The product is analytically pure. It is very hygroscopic and has a melting point of 78° to 82° C. 673 parts of N,N - bis - (chloromethyl) - N,N′-dimethylformamidium chloride is obtained, which is equivalent to 94.3% of the theory, with reference to bis-(chloromethyl)-carbamic chloride used.

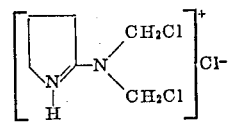

Calculated: C, 29.2; H, 5.33; N, 136. Found: C, 29.3; H, 5.65; N, 13.5.

EXAMPLE 2

N - phenyl - N′ - methyl - N′ - chloromethylformamidinium chloride:

142 parts of N-methyl-N-chloromethylcarbamic chloride is dripped at 85° to 90° C. into a solution of 121 parts of formanilide in 1000 parts by volume of methyl ethyl ketone. When evolution of carbon dioxide had ceased (determined by testing the off-gas), the crystalline salt is filtered off with suction, washed with acetone and filtered off with suction until dry. The product has a melting point of 235° to 237° C. The yield is 136 parts, which is equivalent to 62% of the theory, with reference to N-methyl-N-chloromethylcarbamic chloride used.

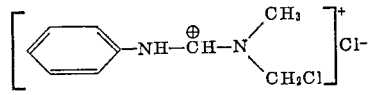

EXAMPLE 3

2 - N,N - bis - (chloromethyl) - amino - Δ1,2 pyrrolin hydrochloride:

264 parts of N,N-bis-(chloromethyl)-carbamic chloride is dripped at 30° to 35° C. into a mixture of 127 parts of pyrrolidone and 100 parts by volume of acetone. The white salt formed is filtered off with suction, washed with acetone and dried. It has a melting point of 110° to 112° C. and probably has the structure:

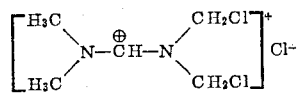

The yield is 275 parts, which is equivalent to 84.7% of the theory, with reference to N,N-bis-(chloromethyl)-carbamic chloride used.

EXAMPLE 4

N - [3 - oxa - pentamethylene] - N′,N′ - bis - (chloromethyl)-formamidinium chloride:

154 parts of bis-(chloromethyl)-carbamic chloride is dripped at 75° to 85° C. into a solution of 100 parts of morpholylformamide in 120 parts by volume of methyl ethyl ketone. When evolution of carbon dioxide has stopped, the product is worked up as in Example 1. It has a melting point of 115° to 117° C. The yield is 168 parts, which is equivalent to 78% of the theory, with reference to bis-(chloromethyl)-carbamic chloride used.

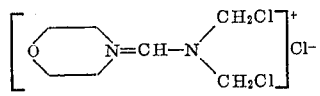

It is difficult to give accurate statements as to the melting points of most chloromethylamidinium salts because they enter partly into reaction with the recrystallization media in which they are dissolved. The chloromethylamidinium salts occurring as the end products of the reaction are usually analytically pure after being washed only once.

EXAMPLE 5

113 parts of caprolactam is dissolved in 150 parts of hot xylene. Then 176 parts of bis-chloromethylcarbamic chloride is dripped at 80° to 90° C. into the solution. In a slightly exothermic reaction with evolution of carbon dioxide, N,N-bis-(chloromethyl)-amino-2-azacyclohexane-(1,2)-hydrochloride separates as a yellow oil.

EXAMPLE 6

142 parts of N-methyl-N-chloromethylcarbamic chloride is slowly dripped at 35 to 45° C. into 59 parts of N-methyl-formamide in 100 parts of toluene. With strong evolution of carbon dioxide, N-methyl-N′-methyl-N′-chloromethylformamidinium chloride is obtained as a thick yellow oil. When N-bis-(chloromethyl)-carbamic chloride is used instead of N-methyl-N-chloromethylcarbamic chloride, the reaction, after an initial delay, proceeds very violently.

EXAMPLE 7

45 parts of formamide is dissolved in 150 parts of methyl ethyl ketone. 176 parts of bis-chloromethylcarbamic chloride is dripped in at 30° to 45° C. After evolution of carbon dioxide has ceased, N,N-bis-(chloromethyl)-formamidinium chloride separates as an oil.

EXAMPLE 8

A mixture of 135 parts of N-methylformanilide and 150 parts of xylene is dripped at 90° to 95° C. into 176 parts of N-bis-(chloromethyl)-carbamic chloride. There is strong evolution of carbon dioxide, and after about three hours 192 parts of N-phenyl-N-methyl-N',N'-bis-(chloromethyl)-formamidinium chloride is obtained as light brown crystals. It is washed with a small amount of acetone and dried. It melts between 93° and 106° C. (not sharply). The yield is 72% of the theory, with reference to N-bis-(chloromethyl)-carbamic chloride.

EXAMPLE 9

89 parts of bis-(chloromethyl)-carbamic chloride is dripped into a boiling solution of 57 parts of diethylacetamide in 100 parts of xylene. After a few hours N,N-diethyl-N',N'-bis-(chloromethyl)-acetamidine hydrochloride separates as a brown oil, which slowly crystallizes when allowed to stand.

EXAMPLE 10

73 parts of dimethylformamide without solvent is dripped slowly and with intense stirring into 176 parts of N-bis-chloromethylcarbamic chloride in a vessel fitted with a stirrer and closed with calcium chloride tubing. After 10 to 15 parts of the dimethylformamide has been added the reaction is allowed to set in and then the reaction mixture is maintained at 40° to 45° C. by cooling. After the vigorous evolution of carbon dioxide has ceased, 175 parts of N,N-dimethyl-N',N'-bis-(chloromethyl)-formamidinium chloride is obtained, which slowly crystallizes. The yield is 85% of the theory, with reference to N-bis-chloromethylcarbamic chloride used.

EXAMPLE 11

89 parts of N-bis-chloromethylcarbamic chloride is slowly dripped at 60° to 70° C. into a solution of 50 parts of diethylformamide in 50 parts of methyl isobutyl ketone. After three to four hours N,N-diethyl-N',N'-bis(chloromethyl)-formamidinium chloride separates as an oil, which slowly solidifies by crystallizing.

EXAMPLE 12

119 parts of N-(p-chlorophenyl)-N-chloromethylcarbamic chloride is slowly dripped at 55° to 65° C. into 37 parts of dimethylformamide. After three to four hours N - N - dimethyl - N' - (p-chlorophenyl)-N'-chloromethylcarbamic chloride separates as a yellow-red oil, which slowly crystallizes out when allowed to cool.

EXAMPLE 13

A mixture of 88 parts of diethylbenzamide, 88 parts of bis-(chloromethyl)-carbamic chloride and 60 parts of methyl isobutyl ketone is kept at 90° to 100° C. for three hours. The crystalline, light brown N,N-diethyl-N',N'-bis-(chloromethyl)-benzamidinium chloride which separates as a precipitate during the reaction is washed with a small amount of methyl ethyl ketone and dried. It melts between 124° and 132° C. 157 parts is obtained, which is equivalent to 43% of the theory, with reference to bis-chloromethylcarbamic chloride.

We claim:

1. A chloromethylamidinium salt having the formula

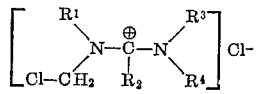

wherein $R^1$ denotes a member selected from the group consisting of alkyl having 1 to 4 carbon atoms, chloroalkyl having 1 to 4 carbon atoms, phenyl, chlorophenyl and nitrophenyl, $R^2$, $R^3$ and $R^4$ each denote a member selected from the group consisting of hydrogen, alkyl having 1 to 4 carbon atoms and aryl with 6 to 10 carbon atoms, $R^2$ and $R^3$ when taken together represent the divalent radical $-(CH_2)_n-$ wherein $n$ is an integer of 3 to 5 so as to form a 5- to 7-membered heterocyclic ring, and $R^3$ and $R^4$ when taken together represent a divalent radical selected from the class consisting of $-CH_2CH_2-O-CH_2CH_2-$ and $-(CH_2)_m-$ wherein $m$ is an integer of 4 to 5 so as to form a 5- to 6-membered heterocyclic ring.

2. N,N-bis-(chloromethyl)-N',N' - dimethylformamidinium chloride.

3. N-phenyl-N'-methyl-N'-chloromethylformamidinium chloride.

4. 2-[N,N-bis-(chloromethyl)-amino] - Δ1,2 pyrrolin hydrochloride.

5. N,N-[3 - oxa - pentamethylene]-N',N'-bis-(chloromethyl)-formamidinium chloride.

References Cited by the Examiner

Arnold, Chem. Abstracts, vol. 53 (1959), pp. 4120–21.

ALEX MAZEL, *Primary Examiner.*

R. J. GALLAGHER, *Assistant Examiner.*